(12) United States Patent
Yuan et al.

(10) Patent No.: US 12,225,197 B2
(45) Date of Patent: Feb. 11, 2025

(54) POINT CLOUD CODING METHOD, POINT CLOUD DECODING METHOD, AND RELEVANT APPARATUSES

(71) Applicant: GUANGDONG OPPO MOBILE TELECOMMUNICATIONS CORP., LTD., Dongguan (CN)

(72) Inventors: Hui Yuan, Dongguan (CN); Xiaohui Wang, Dongguan (CN); Ming Li, Dongguan (CN); Lu Wang, Dongguan (CN); Qi Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 14 days.

(21) Appl. No.: 18/126,082

(22) Filed: Mar. 24, 2023

(65) Prior Publication Data

US 2023/0232002 A1    Jul. 20, 2023

Related U.S. Application Data

(63) Continuation of application No. PCT/CN2020/117941, filed on Sep. 25, 2020.

(51) Int. Cl.
*H04N 11/02* (2006.01)
*H04N 19/124* (2014.01)
(Continued)

(52) U.S. Cl.
CPC ......... *H04N 19/124* (2014.11); *H04N 19/14* (2014.11); *H04N 19/176* (2014.11)

(58) Field of Classification Search
CPC ..... H04N 19/124; H04N 19/14; H04N 19/176
(Continued)

(56) References Cited

U.S. PATENT DOCUMENTS 10,762,667 B2   9/2020  Mekuria
10,861,196 B2   12/2020 Mammou
(Continued)

FOREIGN PATENT DOCUMENTS

CA    3126760 A1    8/2020
CN    108322742 A   7/2018
(Continued)

OTHER PUBLICATIONS

International Search Report in the international application No. PCT/CN2020/117941, mailed on Jun. 23, 2021.
(Continued)

*Primary Examiner* — Jayanti K Patel
*Assistant Examiner* — Richard B Carter
(74) *Attorney, Agent, or Firm* — BAYES PLLC

(57) ABSTRACT

A point cloud coding method, including: partitioning a point cloud, and determining a current coding block; determining a quantization parameter optimization enable identifier, a hierarchical level index, and a quantization parameter offset parameter of the current coding block; determining, according to the hierarchical level index and the quantization parameter offset parameter, a quantization step Qstep corresponding to a level of detail; and upon detecting that the quantization parameter optimization enable identifier is a first value, performing operations for one or more points included in the current coding block.

20 Claims, 10 Drawing Sheets

(51) Int. Cl.
*H04N 19/14* (2014.01)
*H04N 19/176* (2014.01)

(58) Field of Classification Search
USPC .................................. 375/240.02–240.03
See application file for complete search history.

(56) References Cited

U.S. PATENT DOCUMENTS

| | | | |
|---|---|---|---|
| 10,904,564 | B2 | 1/2021 | Yea |
| 10,911,787 | B2 | 2/2021 | Tourapis |
| 2007/0263720 | A1 | 11/2007 | He |
| 2019/0080483 | A1 | 3/2019 | Mammou et al. |
| 2020/0021844 | A1 | 1/2020 | Yea et al. |
| 2020/0021856 | A1 | 1/2020 | Tourapis et al. |
| 2020/0090373 | A1 | 3/2020 | Graziosi |
| 2020/0175725 | A1 | 6/2020 | Mekuria |
| 2020/0366932 | A1 | 11/2020 | Li et al. |
| 2021/0082153 | A1 | 3/2021 | Sugio |
| 2021/0084289 | A1 | 3/2021 | Sugio |
| 2021/0092355 | A1 | 3/2021 | Sugio |
| 2021/0105493 | A1* | 4/2021 | Mammou ............... H04N 19/20 |
| 2021/0209812 | A1 | 7/2021 | Han |
| 2021/0368186 | A1 | 11/2021 | Sugio |
| 2021/0409714 | A1* | 12/2021 | Ramasubramonian ..................... H04N 19/124 |
| 2022/0028120 | A1 | 1/2022 | Sugio |
| 2022/0108489 | A1* | 4/2022 | Sugio ........................ G06T 9/00 |
| 2022/0264085 | A1 | 8/2022 | Galpin |
| 2022/0343548 | A1* | 10/2022 | Park .................... H04N 21/4402 |
| 2023/0118907 | A1* | 4/2023 | Iguchi .................. H04N 19/119 375/240.02 |
| 2024/0064332 | A1* | 2/2024 | Hur ........................... G06T 9/40 |

FOREIGN PATENT DOCUMENTS

| | | |
|---|---|---|
| CN | 109889840 A | 6/2019 |
| CN | 110708560 A | 1/2020 |
| CN | 111095929 A | 5/2020 |
| CN | 111247802 A | 6/2020 |
| CN | 111327897 A | 6/2020 |
| CN | 111327906 A | 6/2020 |
| CN | 111953998 A | 11/2020 |
| JP | 2018078503 A | 5/2018 |
| WO | 2019235366 A1 | 12/2019 |
| WO | 2019240215 A1 | 12/2019 |
| WO | 2019240284 A1 | 12/2019 |
| WO | 2020071414 A1 | 4/2020 |
| WO | 2020162495 A1 | 8/2020 |
| WO | 2020186060 A1 | 9/2020 |
| WO | 2020189709 A1 | 9/2020 |
| WO | 2020189976 A1 | 9/2020 |
| WO | 2020190093 A1 | 9/2020 |
| WO | 2020191260 A1 | 9/2020 |

OTHER PUBLICATIONS

Written Opinion of the International Search Authority in the international application No. PCT/CN2020/117941, mailed on Jun. 23, 2021.
International Search Report in the international application No. PCT/CN2021/087064, mailed on Jul. 2, 2021.
Written Opinion of the International Search Authority in the international application No. PCT/CN2021/087064, mailed on Jul. 2, 2021.
International Search Report in the international application No. PCT/CN2020/138421, mailed on Sep. 7, 2021.
Written Opinion of the International Search Authority in the international application No. PCT/CN2020/138421, mailed on Sep. 7, 2021.
International Search Report in the international application No. PCT/CN2020/138423, mailed on Sep. 13, 2021.
Written Opinion of the International Search Authority in the international application No. PCT/CN2020/138423, mailed on Sep. 13, 2021.
Sehoon Yea et al: "Lossless Scalable Lifting for Attribute Coding", 127. MPEG Meeting; Jul. 8, 2019-Jul. 12, 2019; Gothenburg; (Motion Picture Expert Groue or ISO/IEC JTC1/SC29/WG11), No. m49603, Jul. 9, 2019 (Jul. 9, 2019), XP030207983, the whole document, 6 pages.
Khaled Mammou et al:"G-PCC codec description v2", 125. MPEG Meeting; Jan. 14, 2019-Jan. 18, 2019; Marrakech; (Motion Picture Expert Group or ISO/IEC JTC1/sc29/wG11), No. N18189, Feb. 22, 2019 (Feb. 22, 2019), XP030212734, pp. 26-34, sections 3.6-3.8, 39 pages.
Anonymous:"G-PCC codec description", International Organization for Ftandardization Organisation Internationale De Normalisation ISO/IEC JTC 1/SC 29/WG 7 MPEG 3D Graphics Coding, Oct. 1, 2020 (Oct. 1, 2020), XP055964154, p. 87, section d—p. 91, section c, p. 105, section f—p. 108, section e, 148 pages.
Liu Hao et al: "A Comprehensive Study and Comparison of Core Technologies for MPEG 3-D Point Cloud Compression" IEEE Transactions on Broadcasting, IEEE Service Center, Piscatanay, NJ, US, vol. 66, No. 3, Sep. 1, 2020 (Sep. 1, 2020), pp. 701-717, XP011807048, ISSN: 0018-9316, DOI:10.1109/TBC.2019. 2957652, sections III.C, IV and V, 17 pages.
Supplementary European Search Report in the European application No. 21870758.6, mailed on Feb. 16, 2024, 13 pages.
First Office Action of the Japanese application No. 2023-519013, issued on May 21, 2024, 10 pages with English translation.
Non-Final Office Action of the U.S. Appl. No. 18/125,276, issued on Jun. 25, 2024, 50 pages.

* cited by examiner

| | Lossless geometry, near-lossless attribute [all internal] end-to-end BD attribute | | |
|---|---|---|---|
| | Luma | Chroma Cb | Chroma Cr |
| Catl-A average | -4.8% | -10.7% | -11.6% |
| Catl-B average | -2.0% | -5.4% | -5.8% |
| Overall average | -3.4% | -7.9% | -8.6% |

FIG. 4

POINT CLOUD CODING METHOD, POINT CLOUD DECODING METHOD, AND RELEVANT APPARATUSES

CROSS-REFERENCE TO RELATED APPLICATION

The present application is a continuation of International Application No. PCT/CN2020/117941 filed on Sep. 25, 2020, which is hereby incorporated by reference in its entirety.

BACKGROUND

During picture encoding and decoding, quantization and inverse quantization processing on colour residuals of points are involved. When quantization is performed on the colour residuals of the points by the existing quantification technology, the points are usually quantized by using a fixed quantization step. All colour residuals of the points of the level of detail (LOD) are quantized by using the same quantization step.

SUMMARY

The present disclosure relates to the technical field of picture encoding and decoding, and specifically to a method for point cloud encoding, a method for point cloud decoding, and relevant apparatuses.

Embodiments of the present disclosure provide a method for point cloud encoding, a method for point cloud decoding, and relevant apparatuses, so as to improve the flexibility of determining a quantization step.

In a first aspect, an embodiment of the present disclosure provides a method for point cloud encoding, which includes the following operations.

A point cloud is partitioned, and a current coding block is determined.

A quantization parameter optimization enable identifier, a hierarchical level index, and a quantization parameter offset parameter of the current coding block is determined.

A quantization step Qstep corresponding to a level of detail (LOD) is determined according to the hierarchical level index and the quantization parameter offset parameter.

Upon detecting that the quantization parameter optimization enable identifier is a first value, for one or more points of the point cloud included in the current coding block, the following operations are performed.

The $LOD_i$ where the currently processed point $P_i$ is located is determined.

The point $P_i$ is predicted according to the $LOD_i$ to obtain a prediction value of the point $P_i$.

A quantization step $Qstep_i$ which is adaptive to the $LOD_i$ is determined.

A residual of the point $P_i$ is determined according to the prediction value of the point $P_i$ and an original value of the point $P_i$.

The residual of the point $P_i$ is quantized according to the quantization step $Qstep_i$ to obtain a quantized residual of the point $P_i$.

The quantization parameter optimization enable identifier is encoded, and at least one encoded bit is signalled in a bitstream.

Compared with the related art, when the residual of the currently processed point $P_i$ is quantized by the solution of the present disclosure, the quantization step $Qstep_i$ is determined according to the LOD where the point $P_i$ is located, and quantization is not performed by using a fixed quantization step, which is beneficial to improving the flexibility of determining the quantization step.

In a second aspect, an embodiment of the present disclosure provides a method for point cloud decoding, which includes the following operations.

A quantization step Qstep corresponding to an LOD is determined according to the hierarchical level index and the quantization parameter offset parameter of a current coding block.

For one or more points of the point cloud included in the current coding block, the following operations are performed.

The $LOD_i$ where the currently processed point $P_i$ is located is determined.

The point $P_i$ is predicted according to the $LOD_i$ to obtain a prediction value of the point $P_i$.

A quantization step $Qstep_i$ which is adaptive to the $LOD_i$ is determined.

A quantized residual of the point $P_i$ is determined.

Inverse quantization is performed on the quantized residual of the point $P_i$ according to the quantization step $Qstep_i$ to obtain a reconstructed residual of the point $P_i$; and A reconstructed value of the point $P_i$ is determined according to the reconstructed residual of the point $P_i$ and the prediction value of the point $P_i$.

Compared with the related art, when the inverse quantization is performed on residual of the currently processed point $P_i$ by the solution of the present disclosure, the quantization step $Qstep_i$ which is adaptive to the LOD where the point $P_i$ is located, and the inverse quantization is not performed by using the fixed quantization step, which is beneficial to improving the efficiency of decoding.

In a third aspect, an embodiment of the present disclosure provides an apparatus for point cloud encoding, which includes a division unit, a determination unit, a calculation unit, and a performing unit.

The division unit is configured to partition a point cloud, and determine a current coding block.

The determination unit is configured to determine a quantization parameter optimization enable identifier, a hierarchical level index, and a quantization parameter offset parameter of the current coding block.

The calculation unit is configured to determine, according to the hierarchical level index and the quantization parameter offset parameter, a quantization step Qstep corresponding to the LOD.

The performing unit may be configured to perform, upon detecting that the quantization parameter optimization enable identifier is a first value, the following operations for one or more points of the point cloud included in the current coding block.

The $LOD_i$ where the currently processed point $P_i$ is located is determined.

The point $P_i$ is predicted according to the $LOD_i$ to obtain a prediction value of the point $P_i$.

A quantization step $Qstep_i$ which is adaptive to the $LOD_i$ is determined.

A residual of the point $P_i$ is determined according to the prediction value of the point $P_i$ and an original value of the point $P_i$.

The residual of the point $P_i$ is quantized according to the quantization step $Qstep_i$ to obtain a quantized residual of the point $P_i$.

The quantization parameter optimization enable identifier is encoded, and at least one encoded bit is signalled in a bitstream.

In a fourth aspect, an embodiment of the present disclosure provides a point cloud decoding apparatus, which includes a calculation unit, and a performing unit.

The calculation unit may be configured to determine, according to the hierarchical level index and the quantization parameter offset parameter of a current coding block, a quantization step Qstep corresponding to an LOD.

The performing unit may be configured to perform the following operations for one or more points of the point cloud included in the current coding block.

The $LOD_i$ of the level of detail where the currently processed point $P_i$ is located is determined.

The point $P_i$ is predicted according to the $LOD_i$ to obtain a prediction value of the point $P_i$.

A quantization step $Qstep_i$ which is adaptive to the $LOD_i$ is determined.

A quantized residual of the point $P_i$ is determined.

Inverse quantization is performed on the quantized residual of the point $P_i$ according to the quantization step $Qstep_i$ to obtain a reconstructed residual of the point $P_i$.

A reconstructed value of the point $P_i$ is determined according to the reconstructed residual of the point $P_i$ and the prediction value of the point $P_i$.

In a fifth aspect, an embodiment of the present disclosure provides an encoder, including a non-volatile storage medium and a Central Processing Unit (CPU). The non-volatile storage medium stores an executable program. The CPU is connected to the non-volatile storage medium. When the CPU executes the executable program, the encoder performs the method for point cloud encoding as described in the first aspect.

In a sixth aspect, an embodiment of the present disclosure provides a decoder, including a non-volatile storage medium and a CPU. The non-volatile storage medium stores an executable program. The CPU unit is connected to the non-volatile storage medium. When the CPU executes the executable program, the decoder performs the method for point cloud decoding as described in the second aspect.

In a seventh aspect, an embodiment of the present disclosure provides a terminal. The terminal includes one or more processors, a memory, and a communication interface. The memory and the communication interface are connected to the one or more processors. The terminal communicates with other devices through the communication interface. The memory is configured to store computer program codes. The computer program codes include instructions. When the one or more processors execute the instructions, the terminal performs the method as described in the first aspect or the second aspect.

In an eighth aspect, an embodiment of the present disclosure provides a computer-readable storage medium. The computer-readable storage medium stores instructions. When the instruction runs on a computer, the computer is enabled to execute the method as described in the first aspect or the second aspect.

In a ninth aspect, an embodiment of the present disclosure provides an computer program product comprising instructions. When the instruction runs on a computer, the computer performs the method in the first aspect or the second aspect.

BRIEF DESCRIPTION OF THE DRAWINGS

In order to more clearly illustrate the embodiments of the disclosure or the technical solutions in the related art, the drawings used in the description of the embodiments or the related art will be briefly described below. It is apparent that the drawings in the following description are only some embodiments of the disclosure, and other drawings can be obtained by those skilled in the art according to these drawings without any creative work.

FIG. 4 is a schematic diagram of performance test result provided by an embodiment of the present disclosure.

DETAILED DESCRIPTION

In order to make the purposes, technical solutions and advantages of the present disclosure clearer, the present disclosure will be further described in detail below with reference to the accompanying drawings and embodiments. It should be understood that specific embodiments described herein are merely illustrative of the present disclosure and are not intended to limit the present disclosure.

It is to be understood that, the terms first, second, etc. used in the present disclosure may be used for describing various elements herein, but these elements are limited to these terms. These terms are only used for distinguishing one element from another. For example, without departing from the scope of the present disclosure, a first client may be called a second client, and similarly, the second client may be called the first client. Both the first client and the second client are clients, but they are not the same client.

At present, the existing quantization technology mainly includes a residual quantization technology using a fixed quantization step.

The technology is called a quantization technology for short, and is applied to the encoding of point cloud colour residual. The quantization technology is mainly implemented by the following flow: a) a point cloud is partitioned into a plurality of LODs according to the European distances between point cloud points; and b) the colours of the points in the LODs are predicted in sequence, predicted residuals are calculated, and then quantization encoding is performed.

Figure 1A:
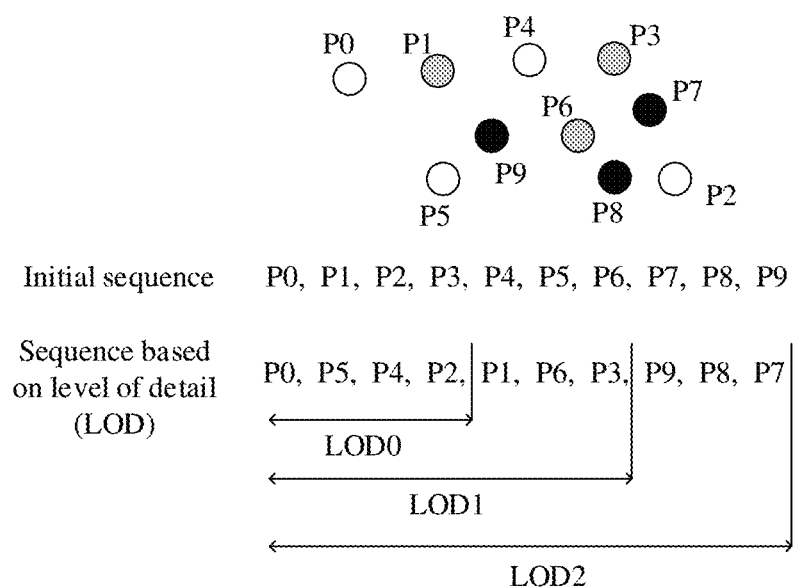
FIG. 1A is a schematic diagram of partitioning level of detail in an embodiment of the present disclosure.

Specifically, the point cloud is partitioned into a plurality of LODs according to a series of user-defined European distances, as shown in FIG. 1A. For each point in the LOD, three nearest neighboring points are found in the LODs in front of the point, and then the current point is predicted by using the colour values of the three neighboring points to obtain a prediction value attrPred. The colour value of the current point is attrValue, and then a quantized residual is:

$$attrResidualQuant = \frac{attrValue - attrPred}{Qstep}.$$

The quantization step Qstep is calculated by a quantization parameter Qp.

Then a reconstructed value of the current point is:

reconstructedColor=attrResidualQuant×Qstep+attrPred.

The current point will be used as the nearest neighbor of a point in the subsequent LOD, and a subsequent point is predicted by using the reconstructed value of the current point.

In the existing quantization technology, the colour residuals of the points in all LODs are quantized by using the fixed quantization step, and the quantization step is fixed and is lack of flexibility.

For the abovementioned problems, embodiments of the present disclosure provide a method for point cloud encoding, a method for point cloud decoding, and relevant apparatuses, so as to improve the flexibility of determining a quantization step and improve the efficiency of decoding.

The embodiments of the present disclosure are described with reference to accompanying drawings.

Figure 1B:
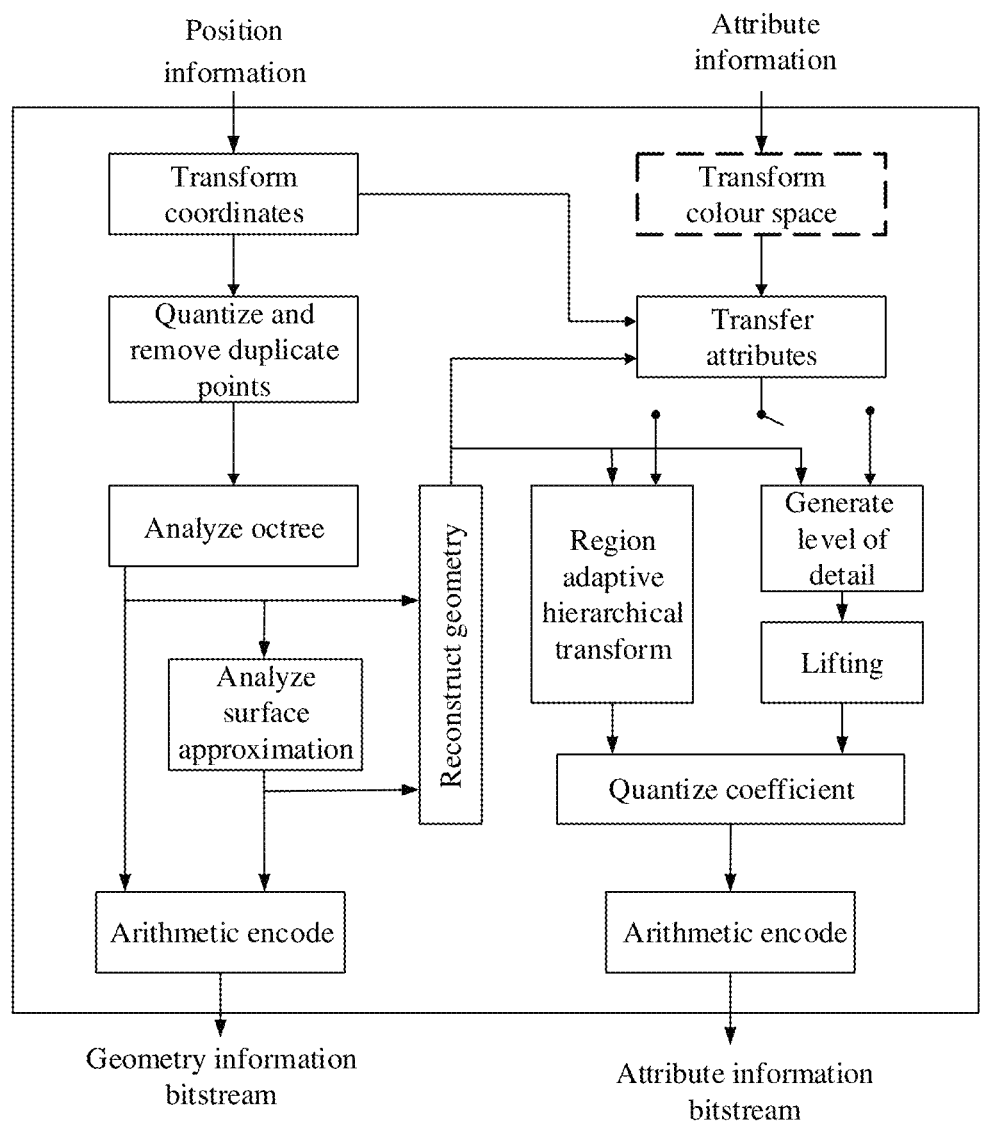
FIG. 1B is a schematic frame diagram of an encoder provided by an embodiment of the present disclosure.

FIG. 1B is a schematic frame diagram of an encoder provided by an embodiment of the present disclosure. As shown in FIG. 1B, when a point cloud is encoded, first, position information is processed through a coordinate transform module (for example: transform coordinates) to respectively subtract minimum values of the xyz coordinates axes from the geometric coordinates of a point, and the point cloud is transformed from world coordinates to relative coordinates. Then, specifically, when there is a geometric loss, duplicate points with consistent geometric coordinates caused by quantizing the geometric coordinates are removed by a geometric quantization and duplicated point removal module (for example: quantize and remove points). Then, the point cloud is partitioned step by step in a form of an octree through an octree analysis module (for example: analyze octree), so that the positions of the points may be in one-to-one correspondence with the positions of the octree, and the positions where there are points in the octree are counted. Then, the data after being operated by the octree analysis module may enter an arithmetic encoding module (for example: arithmetic encode) after being operated by an approximate surface analysis module (for example: analyze surface approximation), and is encoded to obtain a geometry bitstream; or, the data after being processed by the octree analysis module directly enters the arithmetic encoding module. The arithmetic encoding module is used for generating geometry bitstream information by the previous information in an arithmetic encoding mode. The data after being operated by the octree analysis module or the approximate surface analysis module may enter a geometric information reconstruction module (for example: Reconstruct geometry) for operating.

When attribute information is encoded, first, a Red Green Blue (RGB) colour space is transformed into a YUV space or other (or may be directly encoded by using the RGB space) through a colour space transformation module (for example: transform colour). Then, the data enters an attribute transferring module (for example: transfer attributes). The module is used for transferring attributes to point cloud geometry. The point cloud geometry has been compressed at an encoder before attribute encoding, and then is reconstructed. The data after being operated by a reconstruction geometry information module may enter the attribute transferring module or a region adaptive hierarchical transformation module (for example: a RAHT) or a LOD generation module (for example: generate LOD). A certain type of data may be subjected to encoding processing through the region adaptive hierarchical transformation module, and then a residual is quantized by using a quantization step through a Qunatize coefficients module. Next, the encoded attribute information is subjected to arithmetic encoding by using the arithmetic encoding module, and finally, attribute bitstream information is obtained. Another type of data may be processed through the LOD generation module and a lifting module. Finally, the encoded attribute information is subjected to the arithmetic encoding by using the arithmetic encoding module, so as to obtain the attribute bitstream information. The LOD generation module is configured to generate LOD according to the Euclidean distances between points.

Figure 1C:
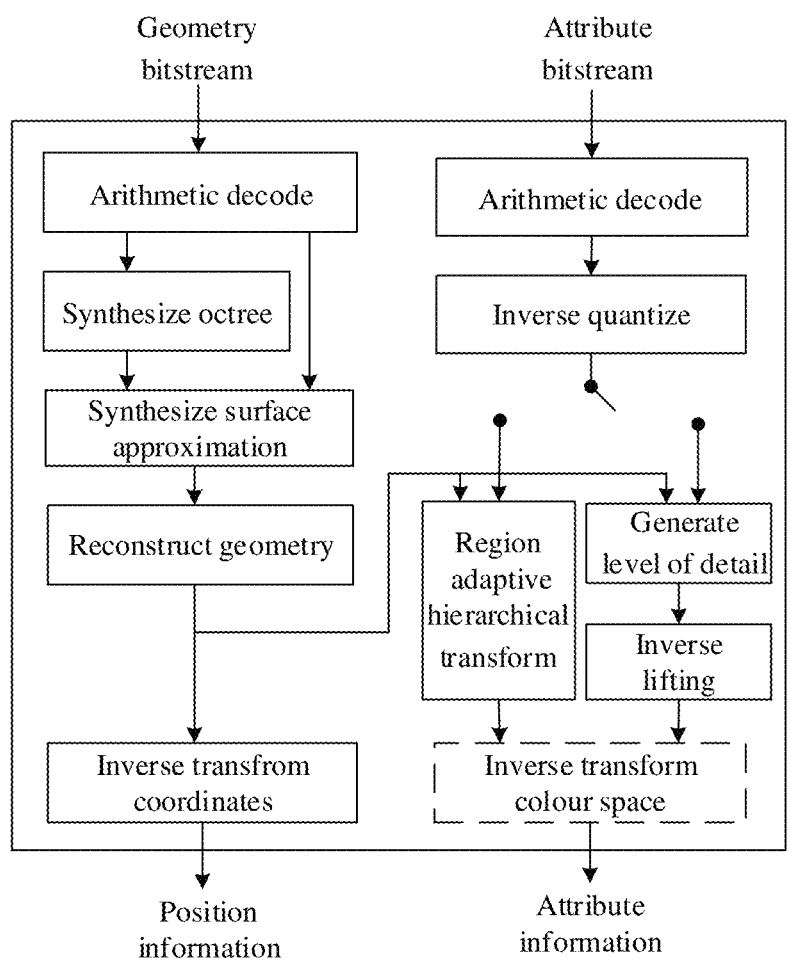
FIG. 1C is a schematic frame diagram of a decoder provided by an embodiment of the present disclosure.

FIG. 1C is a schematic frame diagram of a decoder provided by an embodiment of the present disclosure. As shown in FIG. 1C, when the geometry bitstream is decoded, the geometry bitstream is subjected to the arithmetic decoding processing through an arithmetic decoding module (for example: arithmetic decode). The data after the arithmetic decoding is transmitted into the approximate surface analysis module (for example: analyze surface approximation), or is processed in the approximate surface analysis module after being processed by an octree synthesizer (for example: the synthesize octree). The octree synthesizer is configured to generate a corresponding octree according to the geometry bitstream after being subjected to the arithmetic decoding processing. After being processed by the approximate surface analysis module, the data will be transmitted into the geometry reconstruction module (for example: reconstruct geometry) for processing. The data after being subjected to the geometric reconstruction processing is transmitted into a coordinate inverse transform module (for example: inverse transform coordinates) for performing the inverse transform of the coordinates, so as to obtain position information. In addition, the data after being operated by the geometry reconstruction module may also be transmitted to the region adaptive hierarchical transformation module (for example: RAHT) or the LOD generation module (for example: generate LOD) for processing.

When the attribute bitstream is decoded, it is subjected to arithmetic decoding processing through the arithmetic decoding module, and then the residual is subjected to the inverse quantization by using the quantization step through an inverse quantization module (for example: inverse quantize). A certain type of data may be subjected to decoding processing through the region adaptive hierarchical transformation module, and then is processed through the colour space inverse transformation module (for example: inverse transform colour). Finally, attribute information is output. Another type of data may be processed by the LOD generation module (for example: generate LOD) and an inverse lifting module (for example: inverse lifting) first, and then is processed by the colour space inverse transform module to obtain the attribute information. The LOD generation module is configured to generate LOD according to the Euclidean distances between the points.

Figure 2:
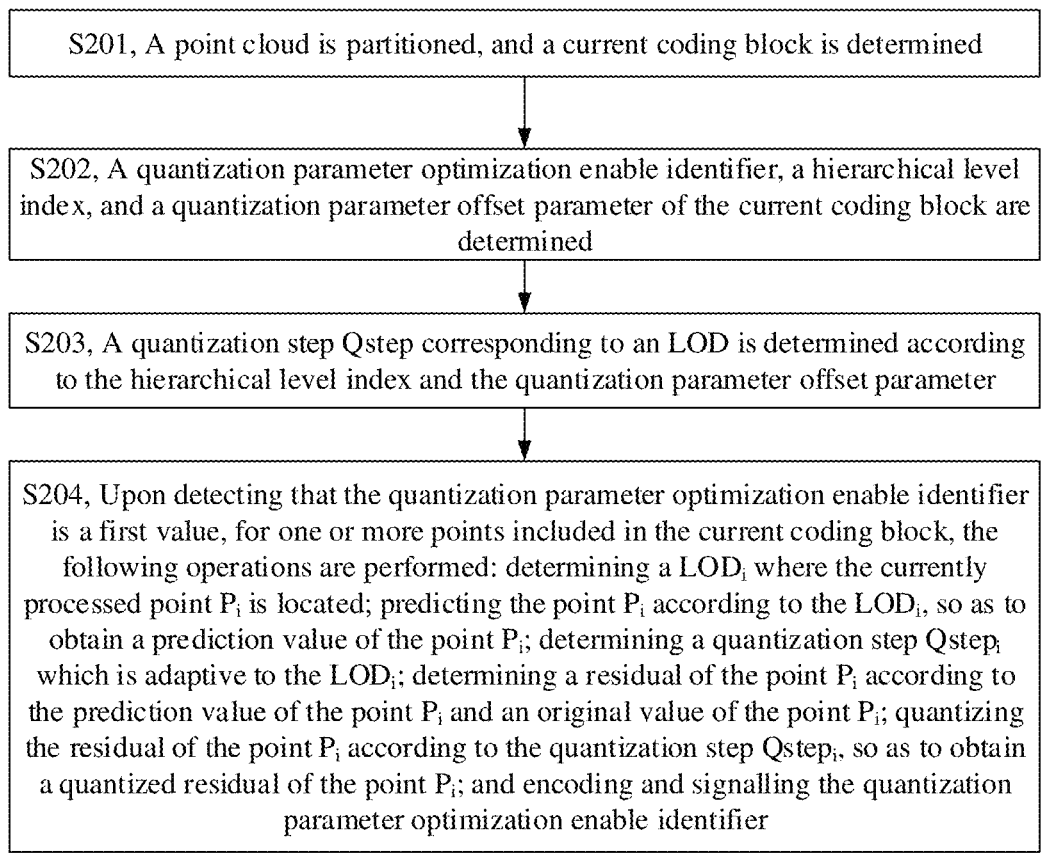
FIG. 2 is a schematic flowchart of a method for point cloud encoding in an embodiment of the present disclosure.

FIG. 2 is a schematic flowchart of a method for point cloud encoding in an embodiment of the present disclosure. The method for point cloud encoding may be applied to a picture encoder as shown in FIG. 1B. As shown in FIG. 2, the method for point cloud encoding provided by the embodiment of the present disclosure includes the following steps.

At S201, a point cloud is partitioned, and a current coding block is determined.

At S202, a quantization parameter optimization enable identifier, a hierarchical level index, and a quantization parameter offset parameter of the current coding block are determined.

Herein, the quantization parameter optimization enable identifier may be enableProgressiveQp, and two values, 0 or 1, may be taken. For example, the hierarchical level index may be LodSplitIndex, and for example, the quantization parameter offset parameter may be QpShiftValue.

At S203, a quantization step Qstep corresponding to an LOD is determined according to the hierarchical level index and the quantization parameter offset parameter.

In specific implementation, after the quantization steps corresponding to different LODs are determined according to the hierarchical level index and the quantization parameter offset parameter, the corresponding relationship between the LODs and the quantization steps may be stored in a loop-up table for finding and determining a quantization step in a subsequent encoding step or decoding step.

In a possible example, the method for point cloud encoding further includes that: the point cloud is partitioned into one or more LODs according to the distances between different points of the cloud point included in the current coding block. The distances between different points may be the Euclidean distances. A series of Euclidean distances corresponding to different LODs may be user-defined. When the points in the point cloud are partitioned into different LODs, the higher the LOD is, the greater the number of the points therein is, and the shorter the Euclidean distances between the points are.

At S204, upon detecting that the quantization parameter optimization enable identifier is a first value, for one or more points included in the current coding block, the following operations are performed: determining a $LOD_i$ where the currently processed point $P_i$ is located; predicting the point $P_i$ according to the $LOD_i$, so as to obtain a prediction value of the point $P_i$; determining a quantization step $Qstep_i$ which is adaptive to the $LOD_i$; determining a residual of the point $P_i$ according to the prediction value of the point $P_i$ and an original value of the point $P_i$; quantizing the residual of the point $P_i$ according to the quantization step $Qstep_i$, so as to obtain a quantized residual of the point $P_i$; and encoding and signalling the quantization parameter optimization enable identifier.

The bitstream includes an attribute parameter set.

In specific implementation, when the current point $P_i$ is predicted to obtain the prediction value of the point $P_i$, the point may be predicted according to the $LOD_i$ where the point $P_i$ is located. For example, when the current $LOD_i=3$, then several points may be determined from the previous LOD, i.e., $LOD_i=2$, and the current point $P_i$ is predicted according to reconstructed values of the several determined points.

After the prediction value of the point $P_i$ is obtained, the residual of the point $P_i$ is determined according to the prediction value of the point $P_i$ and the original value of the point $P_i$. Then, the residual of the point $P_i$ is quantized according to the quantization step $Qstep_i$, so as to obtain a quantized residual of the point $P_i$. Specific residual quantization may be determined through the following formula:

$$attrResidualQuant = \frac{attrValue - attrPred}{Qstep_i}.$$

Herein, attrResidualQuant is the quantized residual of the point $P_i$; attrValue is the original value of the point $P_i$; attrPred is the prediction value of the point $P_i$; $Qstep_i$ is the quantization step; and attr Value-attrPred can represent the residual of the point $P_i$.

In actual application, the quantization step which is adaptive to the LOD of the previous level may be smaller, the quantization step which is adaptive to the LOD of the later level may be larger, the number of the points in the LOD of the previous level is small, the number of the points in the LOD of the later level is large, the LOD with a small number of points is adaptive to a small quantization step, the LOD with a large number of points is adaptive to a large quantization step, and the overall processing duration during encoding is not too long.

In the embodiment of the present disclosure, the LODs of different levels correspond to different quantization steps. Before calculating the quantized residual of the point $P_i$, the quantization step $Qstep_i$ which is adaptive to the LOD where the point $P_i$ is located will be determined first.

In a possible example, after obtaining the quantized residual of the point $P_i$ is obtained, the reconstructed value of the point $P_i$ may also be determined according to the quantized residual of the point $P_i$, the quantization step $Qstep_i$, and the prediction value of the point $P_i$, which may specifically be determined through the following formula:

reconstructedColor=attrResidualQuant×$Qstep_i$+attrPred.

Herein, reconstructedColor is a reconstructed value of the point $P_i$. After the reconstructed value of the point $P_i$ is determined, the point in a subsequent LOD may also be predicted according to the reconstructed value of the point $P_i$.

The larger the quantization step is, the larger the corresponding reconstructed error is, and the smaller the influence on the bitstream size after being processed is, so quantization step which is adaptive to the LOD of the previous level may be smaller, which reduces the reconstruction error and improves the accuracy of predicting the point in the subsequent level. Since the number of points in the LOD of the previous level is small, the bitstream size cannot be affected greatly by using a small quantization step.

In the embodiment of the present disclosure, when the point cloud is encoded, first, the point cloud is partitioned, and the current coding block is determined. Then, the quantization parameter optimization enable identifier, the hierarchical level index, and the quantization parameter offset parameter of the current coding block are determined. According to the hierarchical level index and the quantization parameter offset parameter, the quantization step Qstep corresponding to the LOD is determined. Then, upon detecting that the quantization parameter optimization enable identifier is the first value, for one or more points of the point cloud included in the current coding block, the following operations are performed: first, determining the $LOD_i$ where the currently processed point $P_i$ is located; then, predicting the point $P_i$ according to the $LOD_i$, so as to obtain the prediction value of the point $P_i$; next, determining a quantization step $Qstep_i$ which is adaptive to the $LOD_i$; later on, according to the prediction value of the point $P_i$ and the original value of the point $P_i$, determining a residual of the point $P_i$; quantizing the residual of the point $P_i$ according to the quantization step $Qstep_i$, so as to obtain the quantized residual of the point $P_i$; and finally, encoding the quantization parameter optimization enable identifier, and signalling the encoded bit in the bitstream. It can be seen that, in the solution of the present disclosure, when the residual of the currently processed point $P_i$ is quantized, the quantization step $Qstep_i$ is determined according to the LOD where the point $P_i$ is located, and quantization is not performed by using a fixed quantization step, which is beneficial to improving the flexibility of determining the quantization step.

In a possible example, the operation that the quantization parameter optimization enable identifier, the hierarchical level index, and the quantization parameter offset parameter of the current coding block are determined includes that: coding parameters of the current coding block is acquired; and the quantization parameter optimization enable identifier, the hierarchical level index, and the quantization parameter offset parameter in the coding parameters are read.

A specific implementation mode for acquiring the encoding parameter of the current coding block at least includes that: the coding parameters of the current coding block are determined by optimizing usage rate distortion.

The coding parameters may include parameters preset in a configuration file and/or parameters determined according to the data of the point cloud.

It can be seen that, in the present example, the coding parameters of the current coding block is acquired first, and then the quantization parameter optimization enable identifier, the hierarchical level index, and the quantization parameter offset parameter in the coding parameters are read, which is beneficial to improving the efficiency of determining the quantization parameter optimization enable identifier, the hierarchical level index, and the quantization parameter offset parameter of the current coding block.

In a possible example, the bitstream includes a parameter set bitstream.

In specific implementation, the bitstream includes the parameter set bitstream, so the corresponding parameter may be directly used for decoding according to the parameter set bitstream in the bitstream when the bitstream is decoded subsequently.

It can be seen that, in the present example, the bitstream includes a parameter set bitstream, which is beneficial to improving the efficiency during subsequent decoding.

In a possible example, the parameter set includes the data for decoding one or more point clouds at different times. The data is attribute data. The parameter set is an attribute parameter set.

In specific implementation, the parameter set of the bitstream includes attribute data for decoding the point clouds at different times. When decoding the bitstream subsequently, the parameter set in the bitstream may be directly used for decoding the data of the point clouds at different times.

It can be seen that, in the present example, the parameter set includes the data for decoding one or more point clouds at different times, the data is attribute data, and the parameter set is an attribute parameter set, which is beneficial to improving the efficiency during subsequent decoding.

In a possible example, the operation that the quantization step $Qstep_i$ which is adaptive to the $LOD_i$ includes that: a quantization step lookup table is queried according to the hierarchical level index of the $LOD_i$, and the quantization step $Qstep_i$ corresponding to the $LOD_i$ is acquired. The quantization step lookup table includes a corresponding relationship between the LODs and the quantization steps Qsteps.

In specific implementation, the quantization step lookup table may be queried according to the hierarchical level index corresponding to each $LOD_i$. The quantization step lookup table includes a corresponding relationship between the LODs and the quantization steps Qsteps. The quantization step $Qstep_i$ which is adaptive to a certain $LOD_i$ may be determined in a mode of directly querying the table.

It can be seen that, in the present example, the quantization step lookup table is queried according to the hierarchical level index of the $LOD_i$, and the quantization step $Qstep_i$ corresponding to the $LOD_i$ is acquired. The quantization step lookup table includes the corresponding relationship between the LODs and the quantization steps Qsteps, which is beneficial to improving the flexibility of improving the quantization step.

In a possible example, the operation that the quantization step Qstep corresponding to the LOD is determined according to the hierarchical level index and the quantization parameter offset parameter includes that: a quantization parameter Qp in the encoding parameter of the current coding block is determined; a quantization parameter offset of each LOD is determined according to the hierarchical level index and the quantization parameter offset parameter; and a quantization step Qstep corresponding to each LOD is determined according to the quantization parameter Qp and the quantization parameter offset of each LOD.

The quantization parameter Qp may be determined according to a QP parameter provided by the attribute parameter set.

The relationship between the quantization parameter Qp and the quantization step Qstep is as follows:

$Qstep=2^{(Q_p-4)/6} \times 2^{\lfloor Q_p/6 \rfloor}$.

In practical application, the following formula may be used:

$Qstep=\Delta_0[Q_p\%6] \times 2^{\lfloor Q_p/6 \rfloor}, \Delta_0=\{2^{-4/6}, 2^{-3/6}, 2^{-2/6}, 2^{-1/6}, 2^{1/6}\}<<8=\{161,181,203,228,256,287\}$.

When the residual is quantized, the residual may also be shifted 8 bits to the left for matching.

It can be seen that, in the present example, the quantization parameter Qp in the coding parameters of the current coding block is determined first; then, the quantization parameter offset of each LOD is determined according to the hierarchical level index and the quantization parameter offset parameter; and the quantization step Qstep corresponding to each LOD is determined according to the quantization parameter Qp and the quantization parameter offset of each LOD, which is beneficial to improving the flexibility of improving the quantization step.

In a possible example, the operation that the quantization parameter offset of each LOD is determined according to the hierarchical level index and the quantization parameter offset parameter may include that: whether the currently processed LOD belongs to a level range restrained by the hierarchical level index is determined. The level range includes the first N levels of a plurality of LODs, and N is a positive integer less than or equal to a first threshold value.

If yes, a value j of the quantization parameter offset of the currently processed LOD is determined according to the quantization parameter offset parameter, herein j is an integer greater than 0 and less than or equal to a second threshold value.

If not, the value of the quantization parameter offset of the currently processed LOD is determined as 0.

The range of the hierarchical level index is the number of 0 to LOD (a positive integer). It is assumed that the hierarchical level index is 6, then the quantization steps of $LOD_0$ to $LOD_5$ (that is, the quantization steps of the first 6 LODs) are transformed from QP-QpShiftValue (that is, a quantization parameter-quantization offset parameter).

In addition, if the LOD is further partitioned into a plurality of groups, for example, the hierarchical level index is a number group 4, 5, and 6, correspondingly, the LOD may be partitioned into 4 groups according to these 3 partition positions, which are respectively $LOD_0$ to $LOD_3$, $LOD_4$, and LODs including $LOD_5$ and $LOD_6$ and the subsequent LODs. The values j of the quantization parameter offsets corresponding to different groups may be different.

In specific implementation, the larger the quantization parameter is, the larger the corresponding quantization step is, and the smaller the size of the compressed bitstream is. Herein, j is an integer greater than 0 and less than or equal to a second threshold value, then the quantization parameter corresponding to the LODs of the first N levels are smaller than those of the subsequent levels, which considers the points in the LODs of subsequent high levels will be predicted or transformed by using the reconstructed values of the points in the LODs of previous low levels. If the quantization step of a LOD of a previous level is long, then the corresponding reconstruction error is large. At this moment, the reconstruction error is transferred into the subsequent level, which will affect the prediction of the points of the subsequent LOD, and reduces the accuracy of prediction. Therefore, when the quantization step $Qstep_i$ is determined, the quantization step corresponding to an LOD of low level which is adaptive to a small quantization parameter may be determined, so as to reduce the reconstruction error. Meanwhile, the number of the points in the LOD of low level is small, and the size of the colour bitstream cannot be affected greatly by using a small quantization step. When error of the LOD of previous level is small, the prediction result of the LOD of subsequent level will be better. At this moment, the a good effect can also be achieved without using a small quantization step, the size of the bitstream can also be reduced by the appropriately increased quantization step, and the influence on the efficiency of encoding is reduced.

The first threshold value may be 14, and the second threshold value may be 10. This considers that the total level number of the LODs is generally 11 to 14. The minimum Qp value of the five code rates set in a Common Test Environment (CTC) is set as 10, so j may be a positive integer greater than 0 and less or equal to 10, so as to ensure that there is no negative number after subtracting the value.

For example, j may be 6 or 10. The smaller the value of j is, the smaller the Qp-j is, and the smaller the corresponding quantization step is. Further, the lower the distortion of the reconstructed point is, the smaller the error of the reconstructed point is, and the more accurate the prediction of the point of the LOD of the subsequent level is. Therefore, when j is 10, the prediction result is more accurate, that is, the prediction effect is better. Of course, when the residual of the point of the LOD of low level is quantized, the value of j may also be taken as 6, so as to obtain a smaller quantization step for quantizing the points of the LODs of the first N levels, which is beneficial to reducing the error of the reconstructed value, improving the prediction accuracy, and meanwhile, reducing the influence on the size of the code stream.

For example, N may be 6 or 8. The decrease of the quantization step reduces the error, meanwhile, increases the size of the encoded bitstream, and affects the efficiency of encoding. Therefore, the value of N may be taken as 6, which is basically half of the total level number of the LODs. The number of the points in the previous levels is small, the error is reduced by using the small quantization step, and meanwhile, the bitstream cannot be increased too much. Or, the value of N is 8. The points of LODs of the first 8 levels are quantized by using a small quantization step, which is beneficial to reducing the error of the reconstructed value, improving the subsequent prediction accuracy, and meanwhile, reducing the influence on the size of the bitstream.

It can be seen that, in the present example, whether the currently processed LOD belongs to a level range restrained by the hierarchical level index is determined first. If yes, a value j of the quantization parameter offset of the currently processed LOD is determined according to the quantization parameter offset parameter, and j is an integer greater than 0 and less than or equal to a second threshold value; and if not, the value of the quantization parameter offset of the currently processed LOD is determined as 0. The LOD of the previous level is adaptive to the quantization step corresponding to a small quantization parameter, that is, the LOD of the previous level corresponds to a small quantization step, and the quantization step corresponding to the LOD of a subsequent level is larger than that of the previous level, which is beneficial to improving the prediction accuracy, and meanwhile, reducing the influence on the efficiency of encoding.

In a possible example, if the quantization parameter Qp is greater than or equal to the third threshold value, then j is the first preset value. If the quantization parameter Qp is less than the third threshold value, then j is a second preset value.

The third threshold value may be 30. The first preset value may be 10. The second preset value may be 6.

That is to say, the value of j may be determined in a form of a piecewise function according to the size of the quantization parameter Qp corresponding to the current coding block. For example, when the quantization parameter Qp is greater than or equal to 30, j is 10, and when Qp is less than 30, j is 6.

It can be seen that, in the present example, if the quantization parameter Qp is greater than or equal to 30, then j is 10. If the quantization parameter Qp is less than 30, then j is 6. The value of j is determined according to the value of the quantization parameter Qp, which is beneficial to improving the flexibility of determining the value of j.

In a possible example, the operation that the quantization parameter offset of the LOD is determined according to the hierarchical level index and the quantization parameter offset parameter includes that: a level combination corresponding to the currently processed LOD is determined, the hierarchical level index is queried to determine the hierarchical level index of the currently processed LOD; and the quantization parameter offset parameter is queried according to the hierarchical level index of the currently processed LOD, and the corresponding quantization parameter offset is determined.

For the case that there are a plurality of level groups, for example, four groups. The quantization parameter offset parameter may be a number group, for example 3, 5, 6. That is, the first to fourth groups of quantization parameter offsets are respectively −3, −5, and −6. If the determined quantization parameter is QP, then the quantization parameters of the first to fourth groups are actually QP-3, QP-5, QP-6, and QP respectively.

There may be a plurality of level combinations. Any one level combination may include at least two levels that are neighbouring to each other front and back. The plurality of level combinations include a first level combination and a second level combination. The levels in the first level combination are previous to the levels in the second level combination. The quantization parameter corresponding to the first level combination is smaller than the quantization parameter corresponding to the second level combination. Different level combinations correspond to different quantization parameters, which is beneficial to further distinguishing the quantization step corresponding to the LODs of different levels, and improving the flexibility of determining the quantization step.

The first level combination may include the first two levels of the plurality of LODs. The quantization step corresponding to the first level combination is 1. The first two levels may adopt lossless quantization, which is beneficial to further reducing the error, and improving the accuracy of subsequent prediction. Since the numbers of points in the first two levels are small, the size of the bitstream will not be greatly affected.

The plurality of level combinations may include a first level combination, a second level combination, a third level combination, and a fourth level combination which are sorted from front to back. Any one level combination includes at least two levels that are neighbouring to each other front and back. The first level combination takes the 1/sqrt(4) of the original quantization step as the quantization length of the current level. The original quantization step refers to the quantization step determined according to the quantization parameter. The second level combination takes the 1/sqrt(3) of the original quantization step as the quantization length of the current level. The third level combination takes the 1/sqrt(2) of the original quantization step as the quantization length of the current level. The fourth level combination takes the original quantization step as the quantization length of the current level.

For example, if the original quantization step, i.e., the quantization step determined by the quantization parameter corresponding to the current coding block, is a (a is a positive integer), then the first level combination, the second level combination, the third level combination, and the fourth level combination respectively take α/sqrt(4), α/sqrt(3), α/sqrt(2), and a as the quantization step of the current level. The later the level combination is, the larger the corresponding quantization step is. Different levels in the same level combination adopt the same quantization step. The quantization steps corresponding to the LODs of different levels are further distinguished, which improves the flexibility of determining the quantization step.

It can be seen that, in the present example, when the quantization parameter offset is determined, the level combination corresponding to the LOD is determined first, and then the hierarchical level index corresponding to the LOD in the level combination is further determined, and then the quantization parameter offset parameter is queried according to the corresponding hierarchical level index, so as to determine the corresponding quantization parameter offset. Different level combinations correspond to different quantization parameter offsets, which is beneficial to further partitioning the quantization steps corresponding to the LODs of different levels, and improving the flexibility of determining the quantization step.

In a possible example, the operation that the point $P_i$ is predicted according to the $LOD_i$ to obtain a prediction value of the point $P_i$ includes that: three neighboring points which are closest to the point $P_i$ are determined in the previous level of the $LOD_i$; and the point $P_i$ is predicted by using the reconstructed values of the three neighboring points, so as to obtain the prediction value of the point $P_i$.

For example, if the $LOD_i$ where the point $P_i$ is located is the $LOD_3$, then the three neighboring points which are closest to the point $P_i$ are determined from the $LOD_2$; and then, the prediction value of the point $P_i$ is predicted by using the reconstructed values of the three neighboring points.

In specific implementation, the number of the neighboring points of the first level is 0, which is set to be null.

It can be seen that, in the present example, three neighboring points which are closest to the point $P_i$ are determined from the previous level of the $LOD_i$; and then, the prediction value of the point $P_i$ is obtained by predicting the point $P_i$ by using the reconstructed values of the three neighboring points, which is beneficial to improving the accuracy of the prediction value.

Figure 3:
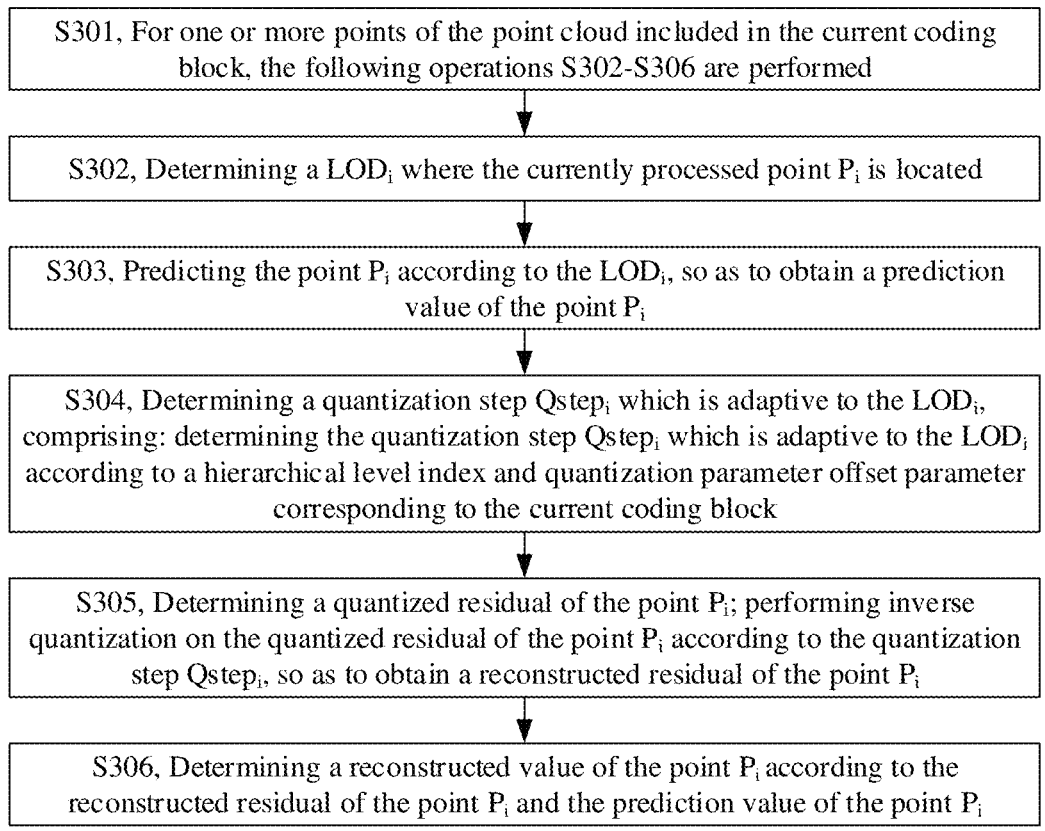
FIG. 3 is a schematic flowchart of a method for point cloud decoding in an embodiment of the present disclosure.

Corresponding to the method for point cloud encoding as shown in FIG. 2, FIG. 3 is a schematic flowchart of a method for point cloud decoding in an embodiment of the present disclosure. The method for point cloud decoding may be applied to a picture decoder as shown in FIG. 1C. As shown in FIG. 3, the method for point cloud decoding provided by the embodiment of the present disclosure includes the following steps.

At S301, for one or more points of the point cloud included in the current coding block, the following operations S302-S306 are performed: at S302, determining a $LOD_i$ where the currently processed point $P_i$ is located; at S303, predicting the point $P_i$ according to the $LOD_i$, so as to obtain a prediction value of the point $P_i$; at S304, determining a quantization step $Qstep_i$ which is adaptive to the $LOD_i$, comprising: determining the quantization step $Qstep_i$ which is adaptive to the $LOD_i$ according to a hierarchical level index and quantization parameter offset parameter corresponding to the current coding block; at S305, determining a quantized residual of the point $P_i$; performing inverse quantization on the quantized residual of the point $P_i$ according to the quantization step $Qstep_i$, so as to obtain a reconstructed residual of the point $P_i$; and at S306, determining a reconstructed value of the point $P_i$ according to the reconstructed residual of the point $P_i$ and the prediction value of the point $P_i$.

For example, inverse quantization may be Scaling. The prediction value may be a colour prediction value in an attribute prediction value.

The number of the LODs is set by the common coding parameter CTC of the point cloud. This part of parameters belongs to an attribute parameter set of the point cloud. In the embodiments of the present disclosure, the inverse quantization is performed on the plurality of partitioned LODs by using different quantization steps Qsteps. The partition of different LODs and variable values of the quantization steps Qsteps may be preset.

In actual application, the quantization step which is adaptive to the LOD of the previous level may be smaller, the quantization step which is adaptive to the LOD of the later level may be larger, the number of the points in the LOD of the previous level is small, the number of the points in the LOD of the later level is large, the LOD with a small number of points is adaptive to a small quantization step, the LOD with a large number of points is adaptive to a large quantization step, and the overall processing duration during decoding is not too long.

In the embodiment of the present disclosure, the quantization step Qstep corresponding to the LOD is determined according to the hierarchical level index and the quantization parameter offset parameter of the current coding block.

For one or more points of the point cloud included in the current coding block, the following operations are performed: determining the $LOD_i$ where the currently processed point $P_i$ is located; predicting the point $P_i$ according to the $LOD_i$, so as to obtain the prediction value of the point $P_i$; determining a quantization step $Qstep_i$ which is adaptive to the $LOD_i$; determining a quantized residual of the point $P_i$; performing inverse quantization on the quantized residual of the point $P_i$ according to the quantization step $Qstep_i$, so as to obtain a reconstructed residual of the point $P_i$; and determining a reconstructed value of the point $P_i$ according to the reconstructed residual of the point $P_i$ and the prediction value of the point $P_i$. It can be seen that, in the solution of the present disclosure, when the inverse quantization is performed on the residual of the currently processed point $P_i$, the quantization step $Qstep_i$ is adaptive to the LOD where the point $P_i$ is located, the inverse quantization is not performed by using a fixed quantization step, which is beneficial to improving the efficiency of decoding.

In a possible example, before the quantization step Qstep corresponding to the LOD is determined according to the hierarchical level index and quantization parameter offset parameter of the current coding block, the method further includes that: a value of a quantization parameter optimization enable identifier of the current coding block is determined; upon detecting that the value of the quantization parameter optimization enable identifier is a first value, the hierarchical level index and the quantization parameter offset parameter of the current coding block are determined; and a quantization step Qstep corresponding to the LOD is determined according to the hierarchical level index and the quantization parameter offset parameter.

In specific implementation, when the quantization step is determined, first, the value of the quantization parameter optimization enable identifier needs to be determined first, the value of the quantization parameter optimization enable identifier may be taken as 0 or 1. One value of them is recorded as the first value. The hierarchical level index and the quantization parameter offset parameter are determined only when the value of the quantization parameter optimization enable identifier is the first value, and the quantization step Qstep corresponding to the LOD is further determined.

It can be seen that, in the present example, the value of the quantization parameter optimization enable identifier of the current coding block is determined first; upon detecting that the value of the quantization parameter optimization enable identifier is the first value, the hierarchical level index and the quantization parameter offset parameter of the current coding block are determined; and the quantization step Qstep corresponding to the LOD is determined according to the hierarchical level index and the quantization parameter offset parameter, which is beneficial to improving the efficiency of decoding.

In a possible example, the operation that the value of the quantization parameter optimization enable identifier of the current coding block is determined includes that: a bitstream is parsed, and the value of the quantization parameter optimization enable identifier in a parameter set of the current coding block is acquired.

In specific implementation, the bitstream may include the parameter set. When the bitstream is parsed, the value of the quantization parameter optimization enable identifier in the parameter set of the current coding block may be acquired.

It can be seen that, in the present example, the value of the quantization parameter optimization enable identifier in the parameter set of the current coding block may be acquired by parsing the bitstream, which is beneficial to improving the efficiency of decoding.

In a possible example, the parameter set is an attribute parameter set of the current coding block.

In specific implementation, when the bitstream is parsed, the value of the quantization parameter optimization enable identifier in the attribute parameter set of the current coding block may be acquired.

It can be seen that, in the present example, the value of the quantization parameter optimization enable identifier in the parameter set of the current coding block may be acquired by parsing the bitstream, which is beneficial to improving the efficiency of decoding.

In a possible example, the operation that the hierarchical level index and the quantization parameter offset parameter of the current coding block are determined includes that: the hierarchical level index and the quantization parameter offset parameter in the attribute parameter set are read.

In specific implementation, the hierarchical level index and the quantization parameter offset parameter in the attribute parameter set may be read directly.

It can be seen that, in the present example, the hierarchical level index and the quantization offset parameter of the current coding block may be determined by reading the hierarchical level index and the quantization parameter offset parameter in the attribute parameter set, which is beneficial to improving the efficiency of decoding.

In a possible example, the operation that the quantization step $Qstep_i$ which is adaptive to the $LOD_i$ is determined includes that: a quantization step lookup table is queried according to the hierarchical level index of the $LOD_i$, and the quantization step $Qstep_i$ corresponding to the $LOD_i$ is acquired. The quantization step lookup table includes a corresponding relationship between the $LOD_S$ and the quantization step Qsteps.

In specific implementation, the quantization step lookup table may be queried according to the hierarchical level index of each $LOD_i$. Since the quantization step lookup table includes a corresponding relationship between the $LOD_S$ and the quantization steps Qsteps, the quantization step $Qstep_i$ which is adaptive to a certain $LOD_i$ may be determined in a mode of directly querying the table.

It can be seen that, in the present example, the quantization step lookup table is queried according to the hierarchical level index of the $LOD_i$, and the quantization step $Qstep_i$ corresponding to the $LOD_i$ is acquired. The quantization step lookup table includes a corresponding relationship between the $LOD_S$ and the quantization steps Qsteps. The LODs of different levels correspond to different quantization steps, which is beneficial to improving the flexibility of determining the quantization step.

In a possible example, the operation that the quantization step Qstep corresponding to the LOD is determined according to the hierarchical level index and the quantization parameter offset parameter includes that: a quantization parameter Qp in the coding parameters of the current coding block is determined; a quantization parameter offset of each LOD is determined according to the hierarchical level index and the quantization parameter offset parameter; and a quantization step Qstep corresponding to each LOD is determined according to the quantization parameter Qp and the quantization parameter offset of each LOD.

In specific implementation, the quantization parameter Qp may be determined according to a QP parameter provided by the attribute parameter set.

After the quantization parameter Qp in the coding parameters of the current coding block is determined, the quantization parameter offset of each LOD may be determined according to the hierarchical level index and the quantization parameter offset parameter, so that the quantization step Qstep corresponding to each LOD is determined according to the determined Qp and the quantization parameter offset of each LOD.

It can be seen that, in the present example, the quantization parameter Qp in the coding parameters of the current coding block is determined first; then, the quantization parameter offset of each LOD is determined according to the hierarchical level index and the quantization parameter offset parameter; next, the quantization step Qstep corresponding to each LOD is determined according to the quantization parameter Qp and the quantization parameter offset of each LOD. The LODs of different levels correspond to different quantization steps, which is beneficial to improving the flexibility of determining the quantization step.

In a possible example, the operation that the quantization parameter offset of each LOD is determined according to the hierarchical level index and the quantization parameter offset parameter includes that: whether the currently processed LOD belongs to a level range restrained by the hierarchical level index is determined. The level range includes the first N levels of a plurality of LODs, and N is a positive integer less than or equal to a first threshold value. If yes, a value j of the quantization parameter offset of the currently processed LOD is determined according to the quantization parameter offset parameter, herein j is an integer greater than 0 and less than or equal to a second threshold value. If not, the value of the quantization parameter offset of the currently processed LOD is determined as 0.

In specific implementation, the first threshold value may be 14, and the second threshold value may be 10. This considers that the total level number of the LODs is generally 11 to 14. The minimum Qp value of the five code rates set in a Common Test Environment (CTC) is set as 10, so j may be a positive integer greater than 0 and less or equal to 10, so as to ensure that there is no negative number after subtracting the value. Since the larger the quantization parameter is, the larger the corresponding quantization step is, and the larger the quantization step is. Herein, j is an integer greater than 0 and less than or equal to 10. The quantization parameters corresponding to the LODs of the first N levels are smaller than those of the later levels, and there is no negative number after subtracting the value.

The range of the hierarchical level index is the number of 0 to LOD (a positive integer). It is assumed that the hierarchical level index is 6, then the quantization steps of $LOD_0$ to $LOD_5$ (that is, the quantization steps of the first 6 LODs) are transformed from QP-QpShiftValue (that is, a quantization parameter-quantization offset parameter).

In addition, if the LOD is further partitioned into a plurality of groups, for example, the hierarchical level index is a number group 4, 5, 6. Correspondingly, the LOD may be partitioned into 4 groups according to these 3 partition positions, which are respectively $LOD_0$ to $LOD_3$, $LOD_4$, and LODs including $LOD_5$ and $LOD_6$ and later LODs. The values j of the quantization parameter offsets corresponding to different groups may be different.

Since the greater the value of j is, the smaller the quantization parameter-quantization parameter offset, i.e., the Qp-j, is, and the smaller the corresponding quantization step is. Considering that the quantization step is small, the decoding time is relatively long, and the efficiency of decoding is affected. Therefore, the value of N may be 6, which is basically half of the total level number of the LODs. The numbers of the points in the previous levels are small, and the decoding time cannot be increased too much when processing is performed by using a small quantization step.

When inverse quantization is performed on the residual of the point in the LODs of the first N levels, i.e., the lower levels, the value of j may be taken as 0, so as to obtain a small quantization step to perform the inverse quantization on the residual of the point in the LODs of the first N levels, which improves the efficiency of decoding.

N may be 8. The inverse quantization is performed on the points of the LODs of the first 8 levels by using the small quantization steps. The numbers of the points of LODs of the first 8 levels are small, which is beneficial to improving the efficiency of decoding.

It can be seen that, in the present example, whether the currently processed LOD belongs to a level range restrained by the hierarchical level index is determined first. If yes, a value j of the quantization parameter offset of the currently processed LOD is determined according to the quantization parameter offset parameter, and j is an integer greater than 0 and less than or equal to a second threshold value; and if not, the value of the quantization parameter offset of the currently processed LOD as 0. The LOD of the previous level is adaptive to the quantization step corresponding to a small quantization parameter, that is, the LOD of the previous level corresponds to a small quantization step, and the quantization step corresponding to the LOD of a later level is larger than that of the later level, which is beneficial to improving the efficiency of decoding.

In a possible example, if the quantization parameter Qp is greater than or equal to the third threshold value, then j is the first preset value. If the quantization parameter Qp is less than the third threshold value, then j is a second preset value.

The third threshold value may be 30. The first preset value may be 10. The second preset value may be 6.

That is to say, the value of j may be determined in a form of a piecewise function according to the quantization parameter Qp corresponding to the current coding block. For example, when the quantization parameter Qp is greater than or equal to 30, j is 10. When Qp is less than 30, j is 6.

It can be seen that, in the present example, if the quantization parameter Qp is greater than or equal to 30, then j is 10. If the quantization parameter Qp is less than 30, then j is 6. The value of j is determined according to the value of the quantization parameter Qp, which is beneficial to improving the flexibility of determining the value of j.

In a possible example, the operation that the quantization parameter offset of each LOD is determined according to the hierarchical level index and the quantization parameter offset parameter includes that: a level combination corresponding to the currently processed LOD is determined, the hierarchical level index is queried to determine the hierarchical level index of the currently processed LOD; and the quantization parameter offset parameter is queried according to the hierarchical level index of the currently processed LOD, and the corresponding quantization parameter offset is determined.

In specific implementation, for the case that there are a plurality of level groups, for example, four groups. The quantization parameter offset parameter may be a number group, for example 3, 5, 6. That is, the first to fourth groups of quantization parameter offsets are respectively −3, −5, and −6. If the determined quantization parameter is QP, then the quantization parameters of the first to fourth groups are actually QP-3, QP-5, QP-6, and QP respectively.

There may be a plurality of level combinations. Any one level combination may include at least two levels that are neighbouring to each other front and back. The plurality of level combinations include a first level combination and a second level combination. The levels in the first level combination are previous to the levels of the second level combination. The quantization parameter corresponding to the first level combination is smaller than the quantization parameter corresponding to the second level combination. Different level combinations correspond to different quantization parameters, which is beneficial to further distinguishing the quantization step corresponding to the LODs of different levels, and improving the flexibility of determining the quantization step.

The first level combination may include the first two levels of the plurality of LODs. The quantization step corresponding to the first level combination is 1. Since the numbers of the points of the first two levels in the LODs are relatively small, the quantization step being 1 cannot affect to the efficiency of decoding greatly.

The plurality of level combinations may include a first level combination, a second level combination, a third level combination, and a fourth level combination which are sorted from front to back. Any one level combination includes at least two levels that are neighbouring to each other front and back. The first level combination takes the 1/sqrt(4) of the original quantization step as the quantization length of the current level. The original quantization step refers to the quantization step determined according to the quantization parameter. The second level combination takes the 1/sqrt(3) of the original quantization step as the quantization length of the current level. The third level combination takes the 1/sqrt(2) of the original quantization step as the quantization length of the current level. The fourth level combination takes the original quantization step as the quantization length of the current level.

For example, if the original quantization step, i.e., the quantization step determined by the quantization parameter corresponding to the current coding block, is a (a is a positive integer), then the first level combination, the second level combination, the third level combination, and the fourth level combination respectively take α/sqrt(4), α/sqrt(3), α/sqrt(2), and a as the quantization step of the current level. The later the level combination is, the larger the corresponding quantization step is. Different levels in the same level combination adopt the same quantization step. The quantization steps corresponding to the LODs of different levels are further distinguished, which improves the flexibility of determining the quantization step.

It can be seen that, in the present example, when the quantization parameter offset is determined, the level combination corresponding to the LOD is determined first, and then the hierarchical level index corresponding to the LOD in the level combination is further determined, and then the quantization parameter offset parameter is queried according to the corresponding hierarchical level index, so as to determine the corresponding quantization parameter offset. Different level combinations correspond to different quantization parameter offsets, which is beneficial to further partitioning the quantization steps corresponding to the LODs of different levels, and improving the flexibility of determining the quantization step.

The solution provided by the present disclosure is implemented on reference software MC13 V9.1 of G-PCC, and part test sequences required by a Moving Picture Experts Group (MPEG) are tested in a CTC CY, referring to FIG. 4, which is a performance comparison diagram of the point cloud encoding/decoding method provided by the embodiment of the present disclosure. Luma represents the gain of a luminance component, Chroma Cb represents the gain of a chroma Cb component, Chroma Cr represents the gain of a chroma Cr component, and Reflectance represents the gain of a reflectivity attribute. Cat1-A includes a low-precision static object and a scenario, which has position and colour information. Cat1-B includes a high-precision static object and a scenario, which has position and colour information. Cat1-A average represents the average gain of all sequences of type Cat1-A, Cat1-B average represents the average gain of all sequences of type Cat1-B, and overall average represents the average performance gain of all test sequences.

An embodiment of the present disclosure provides an apparatus for point cloud encoding. The apparatus for point cloud encoding may be a video decoder or a video encoder. Specifically, the apparatus for point cloud encoding is configured to perform the steps performed by the video decoder in the abovementioned decoding method. The apparatus for point cloud encoding provided by the embodiment of the present disclosure includes modules corresponding to the corresponding steps.

According to the embodiment of the present disclosure, functional modules in the apparatus for point cloud encoding are divided according to the abovementioned method example. For example, various functional modules may be divided corresponding to various functions, or two or more functions may also be integrated into one processing module. The abovementioned integrated module may be implemented in a hardware form and may also be implemented in form of software functional module. The module division in this embodiment of this application is an example, and is merely logical function division, or may be other division during actual implementation.

Figure 5A:
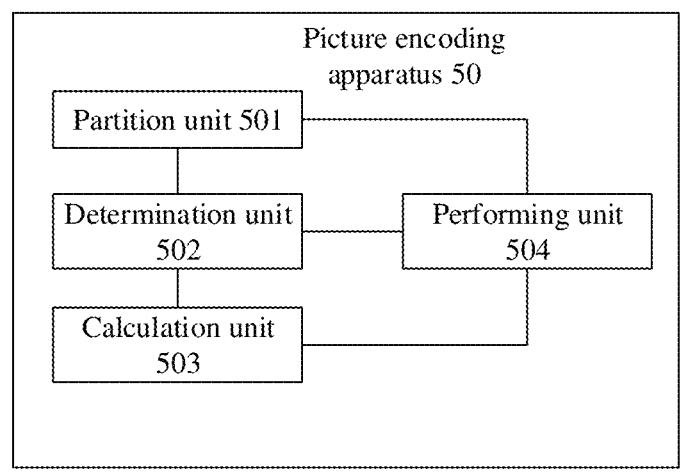
FIG. 5A is a schematic structural diagram of compositions of an apparatus for point cloud encoding in an embodiment of the present disclosure.

When various functional modules are divided for various corresponding functions, FIG. 5A is a possible schematic structural diagram of an apparatus for point cloud encoding involved in the abovementioned embodiment. As shown in FIG. 5A, an apparatus for point cloud encoding 50 includes a partition unit 501, a determination unit 502, a calculation unit 503, and a performing unit 504.

The partition unit 501 is configured to partition a point cloud, and determine a current coding block.

The determination unit 502 is configured to determine a quantization parameter optimization enable identifier, a hierarchical level index, and a quantization parameter offset parameter of the current coding block.

The calculation unit 503 is configured to determine, according to the hierarchical level index and the quantization parameter offset parameter, a quantization step Qstep corresponding to the LOD.

The performing unit 504 is configured to perform, upon detecting that the quantization parameter optimization enable identifier is a first value, the following operations for one or more points included in the current coding block.

An $LOD_i$ where the currently processed point $P_i$ is located is determined.

The point $P_i$ is predicted according to the $LOD_i$, so as to obtain a prediction value of the point $P_i$.

A quantization step $Qstep_i$ which is adaptive to the $LOD_i$ is determined.

A residual of the point $P_i$ is determined according to the prediction value of the point $P_i$ and an original value of the point $P_i$.

The residual of the point $P_i$ is quantized according to the quantization step $Qstep_i$, so as to obtain a quantized residual of the point $P_i$.

The quantization parameter optimization enable identifier is encoded and signalled.

All related content of each step in the abovementioned method embodiments may be cited in function descriptions of a corresponding function module, which will not be elaborated herein. Of course, the apparatus for point cloud encoding provided by the embodiment of the present disclosure includes, but is not limited to, the abovementioned modules. For example, the apparatus for point cloud encoding further includes a storage unit 505. The storage unit 505 may be configured to store a program code and data of the point cloud encoding apparatus.

Figure 5B:
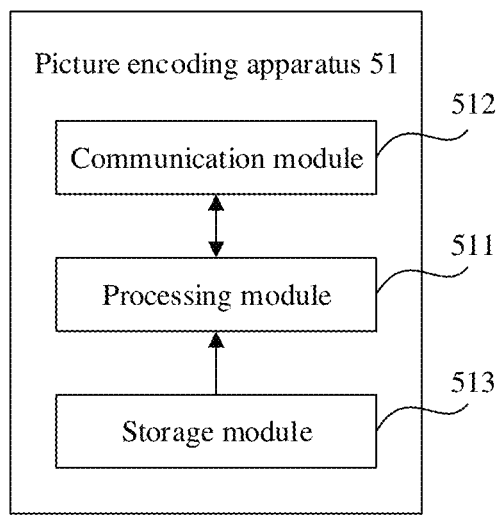
FIG. 5B is another schematic structural diagram of compositions of an apparatus for point cloud encoding in an embodiment of the present disclosure.

In a case where an integrated unit is used, a schematic structural diagram of the apparatus for point cloud encoding provided by the embodiment of the present disclosure is as shown in FIG. 5B. In FIG. 5B, the apparatus for point cloud encoding 51 includes a processing module 511 and a communication module 512. The processing unit 511 is configured to perform control management on an action of the apparatus for point cloud encoding, for example, the steps performed by the partition unit 501, the determination unit 502, the calculation unit 503, the performing unit 504, and/or is configured to perform other processes of the technology as described herein. The communication module 512 is configured to support the interaction between the apparatus for point cloud encoding and other devices. As shown in FIG. 5B, the apparatus for point cloud encoding may further include a storage module 513. The storage module 513 is configured to store a program code and data of the apparatus for cloud point encoding, for example, the content stored in the abovementioned storage unit 505.

The processing module 511 may be a processor or a controller, for example, a CPU, a general-purpose processor, a Digital Signal Processor (DSP), an Application Specific Integrated Circuit (ASIC), a Field Programmable Gate Array (FPGA) or other programmable logic devices, a transistor logic device, a hardware device, or any combination thereof. The processor may implement or perform various example logical blocks, modules, and circuits described with reference to content disclosed in this application. The processor may also be a combination for implementing a computing function, for example, a combination including one or more microprocessors, or a combination of a DSP and a microprocessor. The communication module 512 may be a transceiver, an RF circuit, a communication interface, or the like. The storage module 513 may be a memory.

All related content of each scenario in the abovementioned method embodiments may be cited in function descriptions of a corresponding function module, which will not be elaborated herein. Both the abovementioned apparatus for point cloud encoding 50 and apparatus for point cloud encoding 51 can execute the method for point cloud encoding as shown in the abovementioned FIG. 2. The apparatus for point cloud encoding 50 and the apparatus for point cloud encoding 51 may be a video point cloud encoding apparatus or other devices with a video encoding function.

The present disclosure further provides a video encoder, including a non-volatile storage medium and a CPU. The non-volatile storage medium stores an executable program. The CPU is connected to the non-volatile storage medium, and performs the executable program to implement the method for point cloud encoding of the embodiments of the present disclosure.

An embodiment of the present disclosure provides an apparatus for point cloud decoding. The apparatus for point cloud decoding may be a video decoder or a video encoder. Specifically, the apparatus for point cloud decoding is configured to perform the steps performed by the video decoder in the abovementioned decoding method. The apparatus for point cloud decoding provided by the embodiment of the present disclosure includes modules corresponding to the corresponding steps.

According to the embodiment of the present disclosure, functional modules in the apparatus point cloud decoding are divided according to the abovementioned method example. For example, various functional modules may be divided corresponding to various functions, or two or more functions may also be integrated into one processing module. The abovementioned integrated module may be implemented in a hardware form and may also be implemented in form of software functional module. The module division in this embodiment of this application is an example, and is merely logical function division, or may be other division during actual implementation.

Figure 6A:
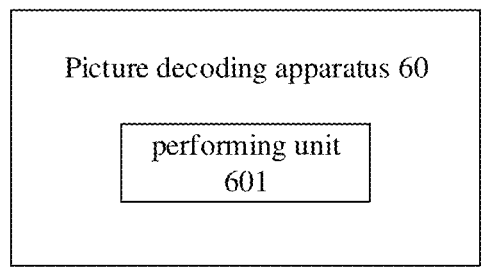
FIG. 6A is a schematic structural diagram of compositions of an apparatus for point cloud decoding in an embodiment of the present disclosure.

When various functional modules are divided for various corresponding functions, FIG. 6A is a possible schematic structural diagram of an apparatus for point cloud decoding involved in the abovementioned embodiment. As shown in FIG. 6A, an apparatus for point cloud decoding 60 includes a performing unit 601.

The performing unit 601 is configured to perform the following operations for one or more points of the point cloud included in the current coding block.

An $LOD_i$ where the currently processed point $P_i$ is located is determined.

The point $P_i$ is determined according to the $LOD_i$, so as to obtain a prediction value of the point $P_i$.

A quantization step $Qstep_i$ which is adaptive to the $LOD_i$ is determined. Specifically, the quantization step $Qstep_i$ which is adaptive to the $LOD_i$ is determined according to a hierarchical level index and quantization parameter offset parameter corresponding to the current coding block.

A quantized residual of the point $P_i$ is determined.

Inverse quantization is performed on the quantized residual of the point $P_i$ according to the quantization step $Qstep_i$, so as to obtain a reconstructed residual of the point $P_i$.

A reconstructed value of the point $P_i$ is determined according to the reconstructed residual of the point $P_i$ and the prediction value of the point $P_i$.

All related content of each step in the abovementioned method embodiments may be cited in function descriptions of a corresponding function module, which will not be elaborated herein. Of course, the point cloud decoding apparatus provided by the embodiment of the present disclosure includes, but is not limited to, the abovementioned modules. For example, the point cloud decoding apparatus further includes a storage unit 603. The storage unit 603 may be configured to store program codes and data of the apparatus for point cloud decoding.

Figure 6B:
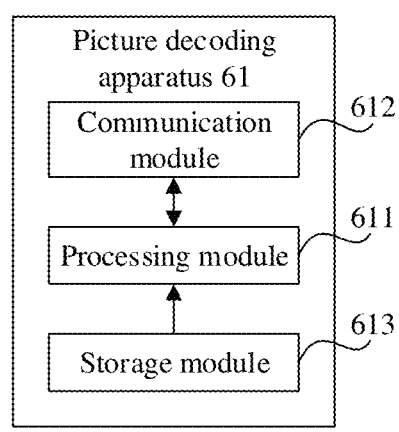
FIG. 6B is another schematic structural diagram of compositions of an apparatus for point cloud decoding in an embodiment of the present disclosure.

In a case where an integrated unit is used, a schematic structural diagram of the apparatus for point cloud decoding provided by the embodiment of the present disclosure is as shown in FIG. 6B. In FIG. 6B, the apparatus for point cloud decoding 61 includes a processing module 611 and a communication module 612. The processing unit 611 is configured to perform control management on an action of the apparatus for point cloud decoding, for example, the steps performed by the calculation unit 601 and the performing unit 602, and/or, is configured to perform other processes of the technology as described herein. The communication module 612 is configured to support the interaction between the apparatus for point cloud decoding and other devices. As shown in FIG. 6B, the apparatus for point cloud decoding may further include a storage module 613. The storage module 613 is configured to store program codes and data of the apparatus for cloud point decoding, for example, the content stored in the abovementioned storage unit 603.

The processing module 611 may be a processor or a controller, for example, a CPU, a general-purpose processor, a DSP, an ASIC, an FPGA or other programmable logic devices, a transistor logic device, a hardware device, or any combination thereof. The processor may implement or perform various example logical blocks, modules, and circuits described with reference to content disclosed in this application. The processor may also be a combination for implementing a computing function, for example, a combination including one or more microprocessors, or a combination of a DSP and a microprocessor. The communication module 612 may be a transceiver, an RF circuit, a communication interface, or the like. The storage module 613 may be a memory.

All related content of each scenario in the abovementioned method embodiments may be cited in function descriptions of a corresponding function module, which will not be elaborated herein. Both the above apparatus for point cloud decoding 60 and the apparatus for point cloud decoding 61 can execute the method for point cloud decoding shown in the abovementioned FIG. 3. The apparatus for point cloud decoding 60 and the apparatus for point cloud decoding 61 may specifically be video point cloud decoding apparatuses or other devices with video decoding functions.

The present disclosure further provides a video decoder, including a non-volatile storage medium and a CPU. The non-volatile storage medium stores an executable program. The CPU is connected to the non-volatile storage medium, and executes the executable program to implement the method for point cloud decoding of the embodiments of the present disclosure.

The present disclosure further provides a terminal. The terminal includes one or more processors, a memory, and a communication interface. The memory and the communication interface are coupled to the one or more processors. The memory is configured to store computer program codes. The computer program codes include instructions. When the one or more processors execute the instructions, the terminal executes the method for point cloud encoding and/or method for point cloud decoding of the embodiments of the present disclosure. The terminal here may be a video display device, a smart phone, a portable computer, and other devices that can process videos or play the videos.

Another embodiment of the present disclosure further provides a computer-readable storage medium. The computer-readable storage medium includes one or more program codes. The one or more program codes include an instruction. When a processor in the decoding device executes the program codes, the decoding device executes the method for point cloud encoding or the method for point cloud decoding of the embodiments of the present disclosure.

In another embodiment of the present disclosure, a computer program product is further provided. The computer program product includes a computer execution instruction. The computer execution instruction is stored in a computer-readable storage medium. At least one processor of a decoding device may read the computer execution instruction from the computer-readable storage medium. The at least one processor executes the computer execution instruction, so that a terminal implements and executes the method for point cloud encoding or the method for point cloud decoding of the embodiments of the present disclosure.

In the abovementioned embodiments, the modules may be completely or partially implemented through software, hardware, firmware, or any combination thereof. When a software program is used to implement the embodiments, all or some of the embodiments may be implemented in a form of a computer program product. The computer program product includes one or more computer instructions. When the computer program instruction is loaded and executed in a computer, the flows or functions according to the embodiments of the application are completely or partially generated.

The computer may be a universal computer, a dedicated computer, a computer network, or other programmable apparatuses. The computer instruction may be stored in a computer-readable storage medium or transmitted from one computer-readable storage medium to another. For example, the computer instruction may be transmitted from one website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium for the computer or a data storage device, such as a server and a data center, including one or more integrated available media. The usable medium may be a magnetic medium (for example, a floppy disk, a hard disk, or a magnetic tape), an optical medium (for example, a DVD), a semiconductor medium (for example, a solid state disk Solid State Disk, SSD), or the like.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another Apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated. The components displayed as units may be a physical unit or a plurality of physical units. That is to say, the components may be located in one place, or may be distributed on a plurality of places. Some or all of the units may be selected according to actual needs to achieve the purpose of the solution of the present embodiment.

In addition, the functional units in the various embodiments of the present disclosure may be integrated into one processing unit, or each unit may exist alone physically, or two or more than two units may be integrated into one unit.

The abovementioned integrated unit may be implemented in a hardware form and may also be implemented in form of software functional unit.

If the integrated unit is implemented in the form of the software functional unit and sold or used as an independent product, it may be stored in the readable storage medium. Based on this understanding, the technical solutions of the embodiments of the present disclosure essentially or the parts that contribute to the conventional technology, or all or part of the technical solutions can be embodied in the form of a software product. The software product is stored in a storage medium, including a plurality of instructions for causing a device (which may be a one-chip computer, a chip, and the like) to execute all or part of the operations of the method described in the embodiments of the present disclosure. The foregoing storage medium includes: various media capable of storing program codes, such as a USB flash disc, a mobile hard disc, a Read-Only Memory (ROM), a Random Access Memory (RAM), a magnetic disc, or a compact disc.

The foregoing descriptions are merely specific implementations of this application, but are not intended to limit the protection scope of this application. Any variation or replacement within the technical scope disclosed in this application shall fall within the protection scope of this application. Therefore, the scope of protection of the present disclosure shall be subject to the scope of protection of the claims.

The invention claimed is:

1. A method for point cloud encoding, comprising:
partitioning a point cloud, and determining a current coding block;
determining a quantization parameter optimization enable identifier, a hierarchical level index, and a quantization parameter offset parameter of the current coding block;
determining, according to the hierarchical level index and the quantization parameter offset parameter, a quantization step Qstep corresponding to a level of detail (LOD); and
upon detecting that the quantization parameter optimization enable identifier is a first value, performing the following operations for one or more points included in the current coding block;
determining an $LOD_i$ where a currently processed point $P_i$ is located;
predicting the point $P_i$ according to the $LOD_i$ to obtain a prediction value of the point $P_i$;
determining a quantization step $Qstep_i$ which is adaptive to the $LOD_i$;
determining, according to the prediction value of the point $P_i$ and an original value of the point $P_i$, a residual of the point $P_i$;
quantizing the residual of the point $P_i$ according to the quantization step $Qstep_i$ to obtain a quantized residual of the point $P_i$; and
encoding and signalling the quantization parameter optimization enable identifier.

2. The method of claim 1, wherein the determining a quantization parameter optimization enable identifier, a hierarchical level index, and a quantization parameter offset parameter of the current coding block comprises:
acquiring coding parameters of the current coding block; and
determining the quantization parameter optimization enable identifier, the hierarchical level index, and the quantization parameter offset parameter in the coding parameters.

3. The method of claim 1, wherein the bitstream comprises a bitstream of parameter set, wherein the parameter set is used for decoding data of one or more point clouds at different times, the data is attribute data; and the parameter set is an attribute parameter set.

4. The method of claim 1, wherein the determining a quantization step $Qstep_i$ which is adaptive to the $LOD_i$ comprises:
querying a quantization step lookup table according to a hierarchical level index of the $LOD_i$ to determine the quantization step $Qstep_i$ corresponding to the $LOD_i$, wherein the quantization step lookup table comprises a corresponding relationship between LODs and quantization step Qsteps.

5. The method of claim 4, wherein the determining, according to the hierarchical level index and the quantization parameter offset parameter, a quantization parameter offset of the LOD comprises:
determining, according to a hierarchical level index corresponding to a level combination which a currently processed LOD is in, a hierarchical level index of the currently processed LOD; and
querying, according to the hierarchical level index of the currently processed LOD, the quantization parameter offset parameter to determine a quantization parameter offset corresponding to the quantization parameter offset parameter.

6. The method of claim 1, wherein the determining, according to the hierarchical level index and the quantization parameter offset parameter, a quantization step $Qstep_i$ corresponding to the $LOD_i$ comprises:
determining a quantization parameter $Qp_i$;
determining, according to the hierarchical level index and the quantization parameter offset parameter, a quantization parameter offset of each $LOD_i$; and
determining, according to the quantization parameter $Qp_i$ and the quantization parameter offset of each $LOD_i$, a quantization step $Qstep_i$ corresponding to each $LOD_i$.

7. The method of claim 6, wherein the determining, according to the hierarchical level index and the quantization parameter offset parameter, a quantization parameter offset of each $LOD_i$ comprises:
determining whether a currently processed LOD belongs to a level range restrained by the hierarchical level index, wherein the level range comprises first N levels of a plurality of LODs, and N is a positive integer less than or equal to a first threshold value;
if yes, determining a value j of the quantization parameter offset of the currently processed LOD according to the quantization parameter offset parameter, wherein j is an integer greater than 0 and less than or equal to a second threshold value; and
if not, determining the value of the quantization parameter offset of the currently processed LOD as 0.

8. The method of claim 7, wherein when the quantization parameter $Qp_i$ is greater than or equal to a third threshold value, then j is a first preset value; and
when the quantization parameter $Qp_i$ is less than the third threshold value, then j is a second preset value.

9. A method for point cloud decoding, comprising:
performing the following operations for one or more points included in a current coding block:
determining an $LOD_i$ where a currently processed point $P_i$ is located;
predicting the point $P_i$ according to the $LOD_i$ to obtain a prediction value of the point $P_i$;

determining a quantization step $Qstep_i$ which is adaptive to the $LOD_i$, comprising:
    determining the quantization step $Qstep_i$ which is adaptive to the $LOD_i$ according to a hierarchical level index and quantization parameter offset parameter corresponding to the current coding block;
determining a quantized residual of the point $P_i$;
performing inverse quantization on the quantized residual of the point $P_i$ according to the quantization step Qstep; to obtain a reconstructed residual of the point $P_i$; and
determining a reconstructed value of the point $P_i$ according to the reconstructed residual of the point $P_i$ and the prediction value of the point $P_i$.

10. The method of claim 9, wherein before determining the quantization step $Qstep_i$ which is adaptive to the $LOD_i$ according to the hierarchical level index and quantization parameter offset parameter corresponding to the current coding block, further comprising:
determining a value of a quantization parameter optimization enable identifier of the current coding block;
if the value of the quantization parameter optimization enable identifier is a first value, determining the hierarchical level index and the quantization parameter offset parameter corresponding to the current coding block; and
determining a quantization step Qstep corresponding to the LOD according to the hierarchical level index and the quantization parameter offset parameter.

11. The method of claim 10, wherein the determining a value of a quantization parameter optimization enable identifier of the current coding block comprises:
parsing a bitstream, and determining the value of the quantization parameter optimization enable identifier in a parameter set of the current coding block.

12. The method of claim 11, wherein the parameter set is an attribute parameter set, wherein the determining the hierarchical level index and the quantization parameter offset parameter of the current coding block comprises:
determining the hierarchical level index and the quantization parameter offset parameter in the attribute parameter set.

13. The method of claim 9, wherein the determining a quantization step $Qstep_i$ which is adaptive to the $LOD_i$ comprises:
querying a quantization step lookup table according to the hierarchical level index of the $LOD_i$ to determine the quantization step $Qstep_i$ corresponding to the $LOD_i$, wherein the quantization step lookup table comprises a corresponding relationship between LODs and quantization step Qsteps.

14. The method of claim 9, wherein the determining a quantization step Qstep; corresponding to the $LOD_i$ according to the hierarchical level index and the quantization parameter offset parameter comprises:
determining a quantization parameter $Qp_i$;
determining a quantization parameter offset of each $LOD_i$ according to the hierarchical level index and the quantization parameter offset parameter; and
determining a quantization step $Qstep_i$ corresponding to each $LOD_i$ according to the quantization parameter $Qp_i$ and the quantization parameter offset of each $LOD_i$.

15. The method of claim 14, wherein the determining a quantization parameter offset of each $LOD_i$ according to the hierarchical level index and the quantization parameter offset parameter comprises:
determining whether a currently processed LOD belongs to a level range restrained by the hierarchical level index, wherein the level range comprises first N levels of a plurality of LODs, and N is a positive integer less than or equal to a first threshold value;
if yes, determining a value j of the quantization parameter offset of the currently processed LOD according to the quantization parameter offset parameter, wherein j is an integer greater than 0 and less than or equal to a second threshold value; and
if not, determining the value of the quantization parameter offset of the currently processed LOD as 0.

16. The method of claim 15, wherein when the quantization parameter $Qp_i$ is greater than or equal to a third threshold value, then j is a first preset value; and
when the quantization parameter $Qp_i$ is less than the third threshold value, then j is a second preset value.

17. The method of claim 14, wherein the determining a quantization parameter offset of each LOD according to the hierarchical level index and the quantization parameter offset parameter comprises:
determining, according to a hierarchical level index corresponding to a level combination which a currently processed LOD is in, a hierarchical level index of the currently processed LOD; and
querying, according to the hierarchical level index of the currently processed LOD, the quantization parameter offset parameter to determine a quantization parameter offset corresponding to the quantization parameter offset parameter.

18. A decoder, comprising a non-volatile storage medium and a central processing unit, wherein the non-volatile storage medium stores an executable program; the central processing unit is connected to the non-volatile storage medium; and when the central processing unit executes the executable program, the decoder performs a method for point cloud decoding comprising:
performing the following operations for one or more points included in a current coding block;
determining an $LOD_i$ where a currently processed point $P_i$ is located;
predicting the point $P_i$ according to the $LOD_i$ to obtain a prediction value of the point $P_i$;
determining a quantization step $Qstep_i$ which is adaptive to the $LOD_i$, comprising:
    determining the quantization step $Qstep_i$ which is adaptive to the $LOD_i$ according to a hierarchical level index and quantization parameter offset parameter corresponding to the current coding block;
determining a quantized residual of the point $P_i$;
performing inverse quantization on the quantized residual of the point $P_i$ according to the quantization step $Qstep_i$ to obtain a reconstructed residual of the point $P_i$; and
determining a reconstructed value of the point $P_i$ according to the reconstructed residual of the point $P_i$ and the prediction value of the point $P_i$.

19. The decoder of claim 18, wherein before determining the quantization step $Qstep_i$ which is adaptive to the $LOD_i$ according to the hierarchical level index and quantization parameter offset parameter corresponding to the current coding block, the decoder further performs:
determining a value of a quantization parameter optimization enable identifier of the current coding block;
if the value of the quantization parameter optimization enable identifier is a first value, determining the hierarchical level index and the quantization parameter offset parameter corresponding to the current coding block; and determining a quantization step Qstep corresponding to the LOD according to the hierarchical level index and the quantization parameter offset parameter.

20. The decoder of claim 19, wherein the determining a value of a quantization parameter optimization enable identifier of the current coding block comprises:
parsing a bitstream, and determining the value of the quantization parameter optimization enable identifier in a parameter set of the current coding block.

* * * * *